United States Patent [19]
Cordell, Jr.

[11] 3,782,024
[45] Jan. 1, 1974

[54] FISH LURE

[76] Inventor: Carl R. Cordell, Jr., P.O. Box 2020, Hot Springs, Ark. 71901

[22] Filed: June 23, 1972

[21] Appl. No.: 265,583

[52] U.S. Cl. ............................................. 43/42.31
[51] Int. Cl. ............................................. A01k 85/00
[58] Field of Search .................................. 43/42.31

[56] References Cited
UNITED STATES PATENTS
| | | | |
|---|---|---|---|
| 2,251,593 | 8/1941 | Mangle | 43/42.31 |
| 3,175,324 | 3/1965 | Blackwell | 43/42.31 X |
| 841,429 | 1/1907 | Passage | 43/42.31 |

Primary Examiner—Louis G. Mancene
Assistant Examiner—Daniel J. Leach
Attorney—Hyman Berman et al.

[57] ABSTRACT

A fish lure having a two-piece plastic body cemented together along a vertical longitudinal plane. A weighted eye member is positioned in a bore at the front of the body and secured in place by an intermediate flange extending into a groove formed in the bore. The weighted eye member simulates an eye for the lure and additionally is loosely mounted so as to rattle to produce fish attracting sounds as the lure is drawn through the water. Metallic eyes are secured to the lure for attaching the lure to a fish line and for attaching hooks to the lure.

10 Claims, 6 Drawing Figures

PATENTED JAN 1 1974 3,782,024

FISH LURE

BACKGROUND OF THE INVENTION

FIELD OF THE INVENTION

The present invention relates to a sounding fish lure.

SUMMARY OF THE INVENTION

A sounding fish lure is disclosed which includes a split plastic body cemented together along a longitudinal vertical plane and encompassing an eye simulating weighted member loosely mounted in a bore through the body so as to rattle as the lure is drawn through the water.

The primary object of the invention is to provide an eye simulating loosely mounted weight in a fish lure for rattling to produce fish attracting sounds.

Other objects and advantages will become apparent in the following specification when considered in light of the attached drawings.

DESCRIPTION OF THE PREFERRED EMBODIMENT

Figure 1:
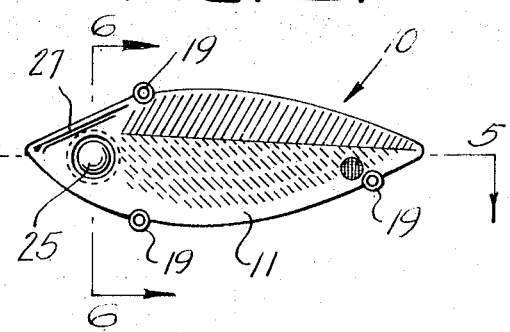
FIG. 1 is a side elevation of the invention.
Figure 2:
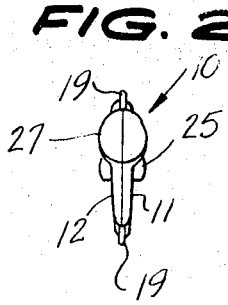
FIG. 2 is a front elevation of the invention.
Figure 3:
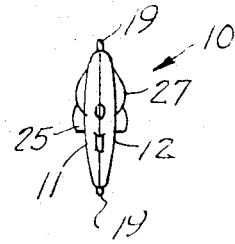
FIG. 3 is a rear elevation of the invention.
Figure 4:
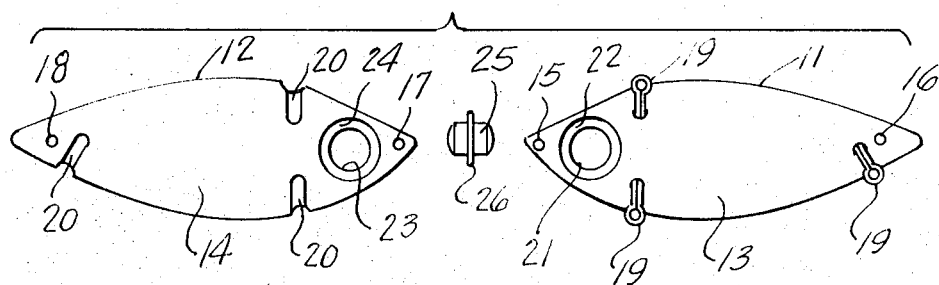
FIG. 4 is an exploded elevational view of the inner faces of the lure and the side edge of the weight.
Figure 5:
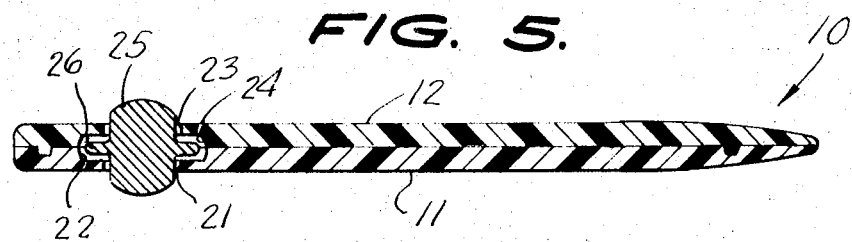
FIG. 5 is an enlarged longitudinal transverse sectional view taken on the line 5—5 of FIG. 1 looking in the direction of the arrows.
Figure 6:
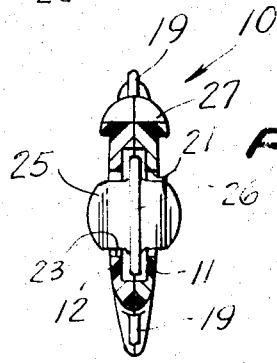
FIG. 6 is an enlarged vertical transverse sectional view taken along the line 6—6 of FIG. 1 looking in the direction of the arrows.

Referring now to the drawings in detail wherein like reference characters indicate like parts throughout the several figures, the reference numeral 10 indicates generally a fish lure constructed in accordance with the invention.

The fish lure 10 includes a pair of plastic body halves 11, 12 having inner vertical faces 13, 14, respectively. The faces 13, 14 are flat and are cemented together as the lure 10 is assembled.

A pin 15 is integrally formed with the lure half 11 and extends outwardly from the face 13 at the forward end of the lure 10. A pin 16 is integrally formed with the lure half 11 and extends outwardly from the face 13 at the rear end of the lure 10. A bore 17 opens inwardly from the face 14 of the lure half 12 adjacent the front end of the lure 10 to receive the pin 15. A bore 18 opens inwardly from the face 14 of the body half 12 at the rear of the lure 10 to receive the pin 16. The pins 15, 16 and bores 17, 18 align the body halves 11, 12 as they are assembled.

A plurality of metallic eyes 19 are seated in the body half 11 and engage in slots 20 in the body half 12 to provide attaching means for the fish line and for the hooks which normally depend from the lure.

A bore 21 extends transversely through the forward portion of the body half 11 and has a counterbore 22 communicating therewith from the face 13. A bore 23 extends transversely through the body half 12 and has a counterbore 24 opening through the face 14 thereof. The bores 21, 23 are axially aligned with the lure 10 assembled as are the counterbores 22, 24.

The generally cylindrical weighted eye simulating member 25 is formed of any desired metal and is provided wtih a central flange 26 extending completely therearound. The cylindrical eye 25 has a diameter less than the diameter of the bores 21 to permit the cylindrical eye 25 to move freely therein. The flange 26 has a thickness substantially less than the depths of the counterbores 22, 24 and has a diameter substantially less than the diameter of the counterbores 22, 24. The flange 26 is engaged in the counterbores 22, 24 with the cylindrical eye 25 extending completely through the lure 10 and beyond the side surfaces thereof. The cylindrical eye 25 has its opposite ends dome-shaped to give the lure 10 the "pop-eyed" appearance simulating many fish.

The forward end of the lure 10 is provided with a transverse rearwardly and upwardly sloping surface 27 to cause an erratic movement of the lure 10 through the water so as to shake the lure 10 and produce a rattling sound as the eye 25 moves in the bores 21, 23.

The rattling sound produced by the eye 25 carries for considerable distances through the water and attracts fish to the lure 10.

Having thus described the preferred embodiment of the invention, it should be understood that numerous structural modifications and adaptations may be resorted to without departing from the spirit of the invention. It is recognized that the sound producing member may take other forms including, but not limited to, other simulated natural features of a fish. Of course, the body 10 and sound producing member 25 may be made of any suitable material.

What is claimed is:

1. A fish lure comprising a pair of plastic body halves cemented together along a vertical longitudinal plane, a pair of axially aligned bores extending through said body halves and having communicating counterbores formed at their respective inner ends, and a weighted eye loosely mounted in said bores and said counterbores for producing a rattling sound as the lure moves through the water.

2. A device as claimed 1 wherein said weighted eye consists of a metallic cylindrical body and an intermediate flange extending outwardly thereof with said body extending through said bore and said flange engaging in said counterbores.

3. A fish lure as claimed in claim 2 including means on the forward end of said lure for creating an erratic movement of said lure as it is drawn through the water.

4. A fish lure as claimed in claim 2 including means on said lure body for securing a fish line and fish hooks thereto.

5. A fish lure as claimed in claim 2 wherein said eye has the cylindrical portion thereof projecting beyond the opposite sides of said fish lure with the outer ends of said eye having a dome-shape.

6. A fish lure comprising a body, a chamber formed centrally in said body, a bore extending through said body and substantially centrally through said chamber and a weighted eye loosely mounted in said bore and said chamber for producing a rattling sound as the lure moves through the water.

7. A device as claimed in claim 6, wherein said weighted eye consists of a metallic cylindrical body and an intermediate flange extending outwardly thereof with said eye body extending through said bore and said flange engaging in said chamber.

8. A fish lure as claimed in claim 7, wherein said eye has the cylindrical portion thereof projecting beyond the opposite sides of said lure body with the outer ends of said eye having a dome shape.

9. A fish lure comprising a body, a chamber formed in said body intermediate the opposite sides thereof and opening through each of said opposite sides, a weighted eye loosely mounted in said chamber for producing a rattling sound as the lure moves through the water, and means on said eye cooperating with said chamber to retain said eye in said body.

10. A device as claimed in claim 9, wherein the means on said eye comprises an integral annular flange formed on said eye.

* * * * *